J. FORBES.

Cultivator and Horse Hoe.

No. 9,530.

Reissued Jan. 11, 1881.

Witnesses:
Jno. J. Gleason
A. W. Lipsett

Inventor:
James Forbes
By his atty.
Wm. S. Thornton

N. PETERS, PHOTO-LITHOGRAPHER, WASHINGTON, D. C.

UNITED STATES PATENT OFFICE.

JAMES FORBES, OF MOOERS, NEW YORK.

CULTIVATOR AND HORSE-HOE.

SPECIFICATION forming part of Reissued Letters Patent No. 9,530, dated January 11, 1881.

Original No. 224,773, dated February 24, 1880. Application for reissue filed July 15, 1880.

*To all whom it may concern:*

Be it known that I, JAMES FORBES, a citizen of the United States, residing at Mooers, in the county of Clinton and State of New York, have invented certain new and useful Improvements in Combined Cultivator and Horse-Hoe; and I hereby declare the following to be a full, clear, and exact description thereof, reference being had to the accompanying drawings, which form a part of this specification.

My invention relates to improvements in combined cultivator and horse-hoe for cultivating corn, grain, and other crops planted in rows; and the said improvements consist, first, in the combination, with a cultivator-frame carrying a series of cultivator-plows and gage-cutters, and arranged to travel wide end foremost, of novel devices, hereinafter specifically described, for adjusting the width of and raising and lowering the said plows; and, second, of a series of plows arranged upon a triangular frame and capable of being raised or lowered at will by a hand-lever, and otherwise so constructed as to be adapted for wide or narrow rows or furrows, all of which is herinafter particularly described, and pointed out in the claims.

Figure 1:
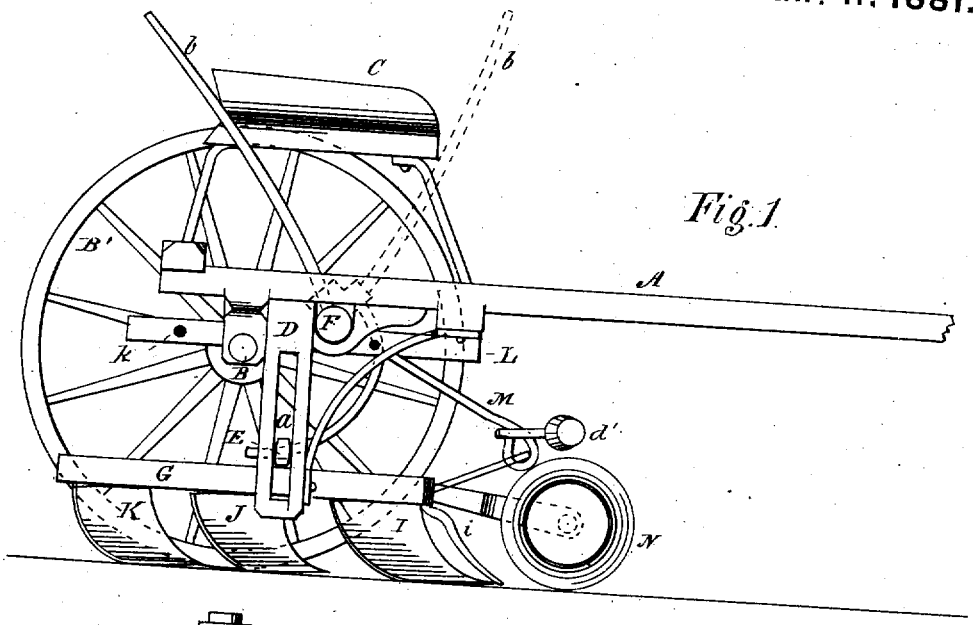
Figure 2:
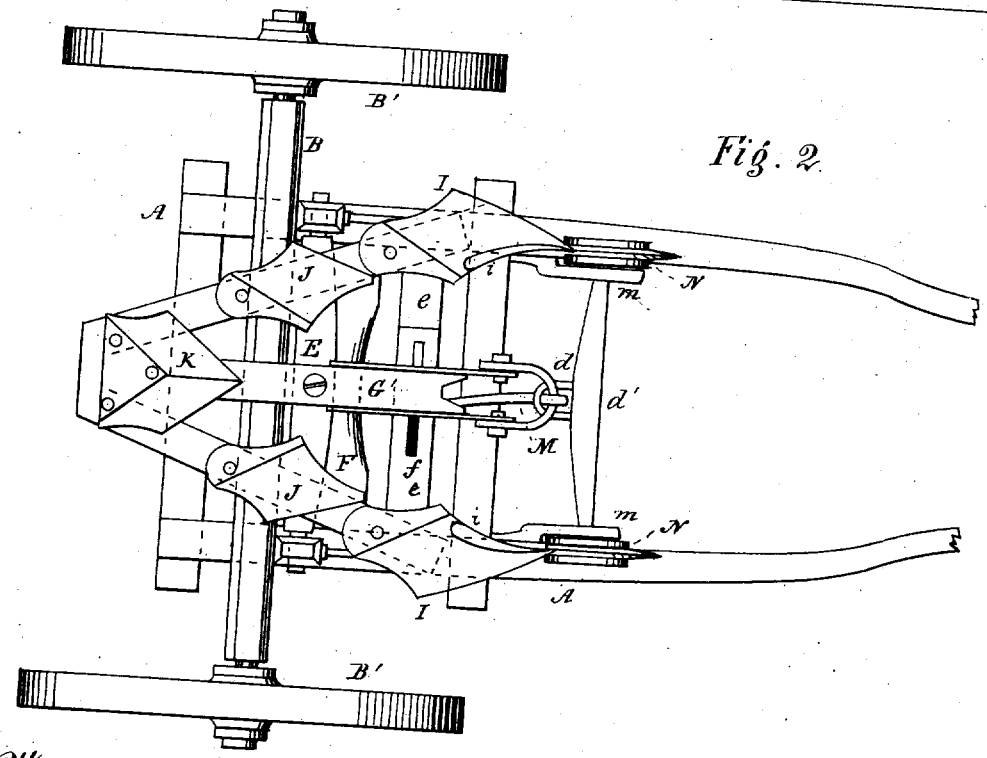

Referring to the drawings, Figure 1 represents a side view of my invention with one wheel removed for the purpose of more clearly showing the mechanism, and Fig. 2 represents a plan view of the cultivator-plows.

Similar letters of reference indicate the same parts in both the figures.

A represents the frame and shafts, secured to the axle B carrying the wheels B′, and provided with a suitable seat, C, as shown.

D represents a slotted bar, one on each side of the frame A and projecting downward, in the slot *a* of which move the ends of the sliding transverse bar E, to which the cultivator-frame is attached.

F represents a rotating transverse bar, which has its bearings in the frame A, and is provided with a hand-lever, *b*, projecting above the seat C, and with downwardly-curved rods *c*, which pass through openings in the lower transverse bar, E, for the purpose of raising and lowering the said transverse bar E, carrying the cultivator plows and frame, which latter is composed of the side beams, G, and central beam, G′, arranged in a triangular shape, said beams G being hinged or pivoted at the rear or tapering end to the central beam, G′, which latter is provided at the front with an adjustable clevis, *d*, carrying the whiffletree *d′*, as shown.

It will be observed that the plow-frame is arranged in relation to the other parts so that its wide end travels in advance of its narrow end.

Across the front or broadest part of the beams G G are arranged two metallic plates, *e e*, which are securely fastened at one end to the beams G G, while the other ends, resting upon the central beam, G′, are provided with elongated slots *f*, which overlap one another, and a clamping-screw, passing through the same and entering the central beam, G′, serves to clamp the plates at any desired length to enable the beams G G to be moved nearer together or wider apart, to suit either wide or narrow rows or furrows.

I represents the two front landside-plows, arranged upon the forward ends of the beams G G, opposite each other, and provided with the colters *i*, as shown. J represents the next two succeeding plows, arranged upon the beams G G, in the rear of the plows I; and K represents the double plow, arranged at the rear ends of the beams G G G′, where they are pivoted or hinged together.

Beneath the frame A and rotating transverse bar F is securely fastened a beam, L, which is provided with openings *k*, within which fits the end of a rod, M, the opposite end of which is secured to the clevis *d*, attached to the whiffletree *d′*.

To the inner sides of the beams G G are attached projecting arms *m*, the outer ends of which are provided with wheels N, having sharp cutting-edges and a flanged shoulder, as shown. The sharp edges of these wheels cut into the soil to the depth of the flanged shoulder, and serve to regulate the depth of the plowing, as well as to keep the cultivator in a straight line.

The construction and arrangement of the cultivator-plows being as above described, in the operation of the same the first two plows turn two furrows, one each way, next to and toward the growing crop, and are succeeded by the next two plows, turning another furrow on each side, and leaving them where the first furrows were taken from, and, lastly, comes the double plow, throwing two furrows, one on each side, and leaving a dead-furrow in the center of the row. By these means the furrows are evenly laid, the weeds are thoroughly turned under, and no one furrow is thrown over another, as is the case when the plow-frame is set to travel narrow end first.

When it is desired to transport the cultivator from one place to another, or to raise the plows when in operation, the hand-lever *b* is pulled forward and slipped around the front edge of the seat C, thereby causing the rotating transverse bar F to turn and operate the curved arms *c*, which draws up the frame and plows, as shown in dotted lines in Fig. 1.

It will be understood that my improved cultivator is adapted not only for use in connection with the vehicle-frame, but may be detached therefrom and supplied with the ordinary plow-handles, and operated in the same manner as the ordinary cultivators, in which case it can be furnished at a much less cost than it could be when attached to the vehicle-frame.

Having thus described my improvements, what I claim as new and useful is—

1. In combination with the slotted metallic plates *e e*, rotating transverse bar F, rods *c*, hand-lever *b*, and sliding transverse bar E, the triangular cultivator-frame G G G′, carrying the plows I J K and gage-cutters N, the said frame being arranged, as shown and described, so that its wide end travels in advance of its narrow end, as and for the purposes set forth.

2. The triangular cultivator-frame G G G′, carrying the plows I J K and gage-cutters N, and provided with the sliding transverse bar E, in combination with the slotted bars D and rotating transverse bar F, attached to the frame A, and hand-lever *b*, and curved arms or rods *c*, substantially as and for the purpose specified.

JAMES FORBES.

Witnesses:
JOHN S. THORNTON,
M. H. TOPPING.